(12) United States Patent
Watanabe et al.

(10) Patent No.: US 10,187,547 B2
(45) Date of Patent: Jan. 22, 2019

(54) IMAGE READING SYSTEM CONFIGURED TO DETECT DOCUMENT EDGE

(71) Applicant: BROTHER KOGYO KABUSHIKI KAISHA, Nagoya-shi, Aichi-ken (JP)

(72) Inventors: Toshihiro Watanabe, Kuwana (JP); Hiroyuki Nakazawa, Kasugai (JP)

(73) Assignee: BROTHER KOGYO KABUSHIKI KAISHA, Nagoya-shi, Aichi-Ken (JP)

( * ) Notice: Subject to any disclaimer, the term of this patent is extended or adjusted under 35 U.S.C. 154(b) by 0 days.

(21) Appl. No.: 15/359,865

(22) Filed: Nov. 23, 2016

(65) Prior Publication Data

US 2017/0155796 A1 Jun. 1, 2017

(30) Foreign Application Priority Data

Nov. 26, 2015 (JP) ................................. 2015-230886

(51) Int. Cl.
*H04N 1/407* (2006.01)
*H04N 1/00* (2006.01)

(52) U.S. Cl.
CPC ......... *H04N 1/407* (2013.01); *H04N 1/00748* (2013.01); *H04N 2201/0081* (2013.01); *H04N 2201/0094* (2013.01)

(58) Field of Classification Search
CPC ............... H04N 1/407; H04N 1/00748; H04N 2201/0081; H04N 2201/0094
USPC .................................. 358/462, 448, 518, 505
See application file for complete search history.

(56) References Cited

U.S. PATENT DOCUMENTS

| | | | | |
|---|---|---|---|---|
| 5,719,613 A * | 2/1998 | Fukui | .................. | G03G 15/326 347/132 |
| 5,999,275 A | 12/1999 | Hagihara | | |
| 2001/0043368 A1* | 11/2001 | Morikawa | .............. | H04N 1/407 358/1.9 |
| 2003/0095272 A1* | 5/2003 | Nomizu | ............. | H04N 1/32561 358/1.9 |
| 2014/0211276 A1* | 7/2014 | Kato | .................. | H04N 1/00816 358/488 |

(Continued)

FOREIGN PATENT DOCUMENTS

| | | |
|---|---|---|
| JP | 8-18779 A | 1/1996 |
| JP | 10-145556 A | 5/1998 |

(Continued)

*Primary Examiner* — Quang N Vo
(74) *Attorney, Agent, or Firm* — Merchant & Gould P.C.

(57) ABSTRACT

An image reading system includes a reading device, a first calibration unit, and a detection unit. The reading device is configured to read a white reference member to acquire white image data and configured to read an original document to acquire document image data. The first calibration unit is configured to calibrate shading of the document image data to generate first image data by performing converting a density value in the document image data to a gradation value that is proportional to the density value and falls within a predetermined range having a minimum gradation value, a maximum gradation value, and a target value less than the maximum gradation value. The density value equal to the corresponding density value is converted to the target value in the conversion. The detection unit is configured to detect pixels in the image data corresponding to an edge of the original document.

10 Claims, 14 Drawing Sheets

(56) References Cited

U.S. PATENT DOCUMENTS

2015/0098095 A1\* 4/2015 Zaima ................. H04N 1/6005
358/1.2

FOREIGN PATENT DOCUMENTS

| JP | 2004-328154 A | 11/2004 |
|---|---|---|
| JP | 2007-28553 A | 2/2007 |

\* cited by examiner

FIG.3
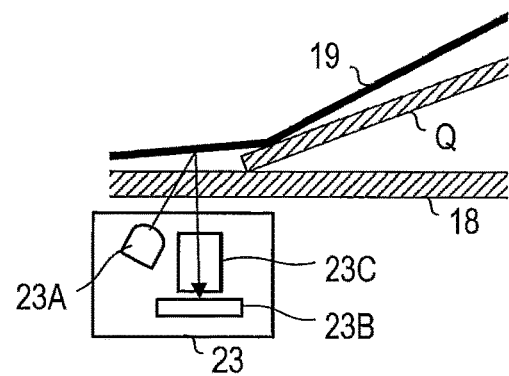
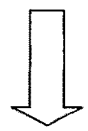
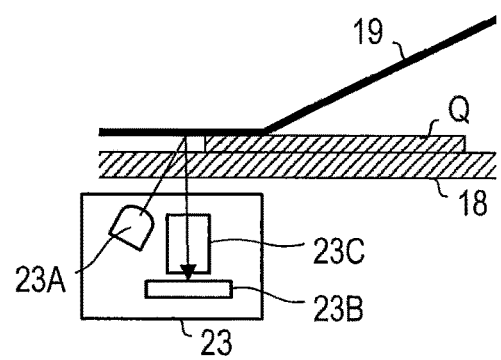
FIG.4
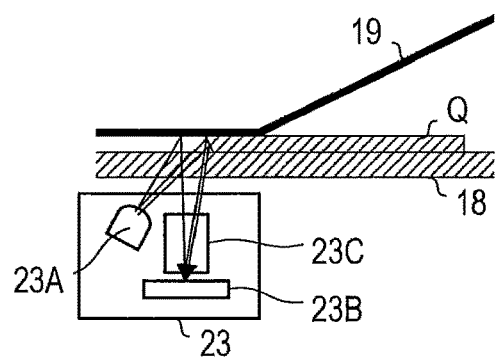

FIG.13A

| -1 | 0 | 1 |
|----|---|---|
| -2 | 0 | 2 |
| -1 | 0 | 1 |

FIG.13B

| -1 | -2 | -1 |
|----|----|----|
| 0  | 0  | 0  |
| 1  | 2  | 1  |

LINE NUMBER

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 1 | 1 | 1 | 1 | 1 | 1 | 0 | 0 | 0 | 0 | 0 | 0 |
| 8 | 0 | 0 | 0 | 0 | 0 | 0 | 1 | 1 | 1 | 1 | 1 | 1 | 1 | 1 | 1 | 1 | 1 | 0 |
| 9 | 0 | 0 | 0 | 0 | 0 | 1 | 1 | 0 | 0 | 0 | 0 | 0 | 0 | 1 | 1 | 1 | 1 | 1 |
| 10 | 0 | 0 | 0 | 0 | 0 | 1 | 0 | 0 | 0 | 0 | 0 | 0 | 0 | 0 | 0 | 0 | 0 | 1 |
| 11 | 0 | 0 | 0 | 0 | 1 | 0 | 0 | 0 | 0 | 0 | 0 | 0 | 0 | 0 | 0 | 0 | 0 | 0 |
| 12 | 0 | 0 | 0 | 0 | 1 | 0 | 0 | 0 | 0 | 0 | 0 | 0 | 0 | 0 | 0 | 0 | 0 | 0 |
| 13 | 0 | 0 | 0 | 1 | 0 | 0 | 0 | 0 | 0 | 0 | 0 | 0 | 0 | 0 | 0 | 0 | 0 | 0 |
| 14 | 0 | 0 | 0 | 1 | 0 | 0 | 0 | 0 | 0 | 0 | 0 | 0 | 0 | 0 | 0 | 0 | 0 | 0 |
| 15 | 0 | 0 | 1 | 0 | 0 | 0 | 0 | 0 | 0 | 0 | 0 | 0 | 0 | 0 | 0 | 0 | 0 | 0 |
| ⋮ | | | | | | | | | | | | | | | | | | |
| E | 0 | 0 | 0 | 0 | 0 | 0 | 0 | 0 | 0 | 0 | 0 | 0 | 0 | 0 | 0 | 0 | 0 | 0 |

| M | M | 15 | 13 | 11 | 9 | 7 | 7 | 7 | 7 | 7 | 7 | 7 | 8 | 8 | 8 | 8 | 8 | 9 |

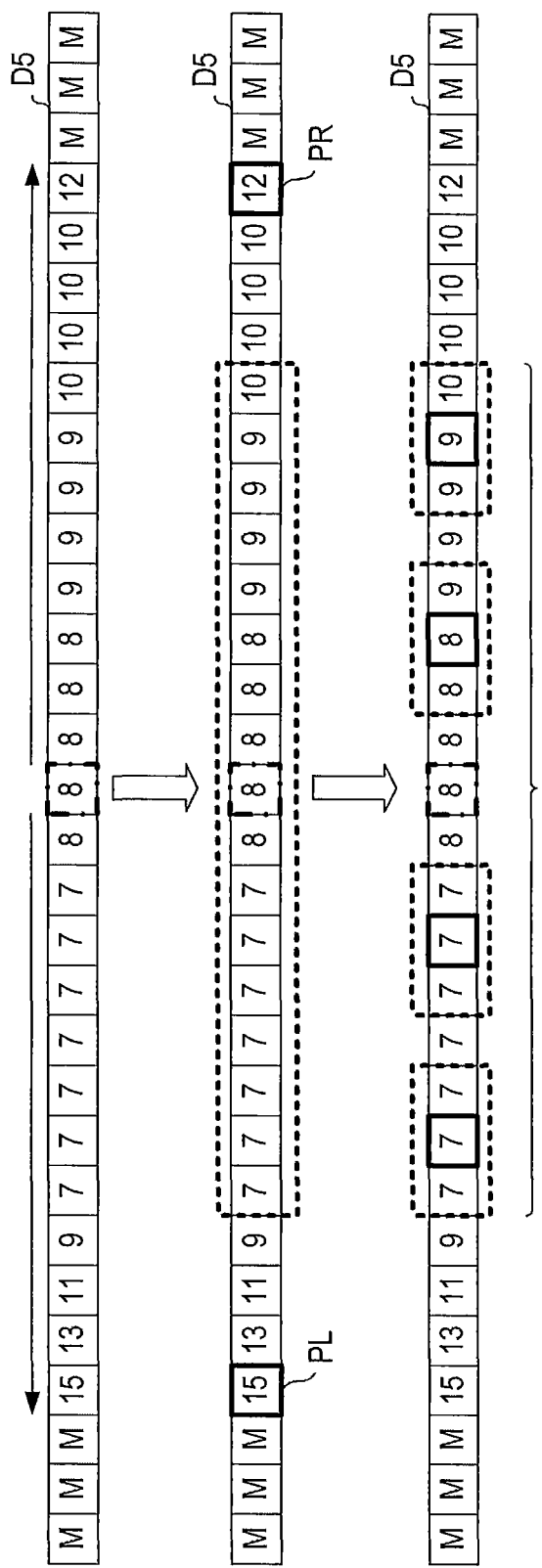

IMAGE READING SYSTEM CONFIGURED TO DETECT DOCUMENT EDGE

CROSS REFERENCE TO RELATED APPLICATION

This application claims priority from Japanese Patent Application No. 2015-230886 filed Nov. 26, 2015. The entire content of the priority application is incorporated herein by reference.

TECHNICAL FIELD

The present disclosure relates to an image reading system.

BACKGROUND

There has been known a document reading device having a light source that emits light from the outside of document area toward a document edge and another light source that emits light from the document area toward the document edge. When detecting a leading edge and a trailing edge of the document, the document reading device selectively turns on one of the two light sources so as to form a short shadow at the document edge to be detected. The document reading device determines the document edge according to the detected short shadow formed by the lighting.

Other than the above configuration, there is also known another reading device having a light source that emits light in a single direction toward the document.

SUMMARY

In the another reading device, light may not be emitted in a certain direction to form the short shadow for detecting the document edge. In this case, the document edge appears as a white bright region in image data representing a read image of the document. Hereinafter, the document edge appearing as the white bright region in the image data is also referred to as "white edge".

The white edge may be a reason that the document edge cannot be accurately determined from the image data. This has an unfavorable effect on a document inclination correction process. A known technology described in JP 2004-328154A may eliminate or minimize the white edge. However, taking production cost and productivity into consideration, it is preferable that the document edge in the read image data can be accurately determined even in a situation with the white edge, i.e., even in a case where the document is read by the reading device provided with a light source that emits light in a single direction toward the document.

In a conventional shading calibration or correction, density value of each pixel of the read image data is converted into the gradation value so that the density value of the read image data coinciding with the density value of the white image data is converted into the maximum gradation value. Accordingly, the shading calibration generates calibrated multi-gradation data, and the calibrated multi-gradation data is calibrated by gamma correction to generate multi-gradation data of the original.

Such shading calibration contributes to generation of high quality multi-gradation image data of the document. However, employing this shading calibration, the gradation value of the white edge in the image data after shading calibration represents the maximum gradation value (white) like the non-document region. That is, because of the function of the conventional shading calibration, a feature (brighter than the surrounding) of the white edge is lost, thus making it difficult to detect the document edge with high quality in the image data after the calibration or correction.

Therefore, it is desirable to provide a technology that can detect the document edge with accuracy from the image data including the white edge.

According to one aspect, the disclosure provides an image reading system including a reading device, a first calibration unit, and a detection unit. The reading device is configured to read a white reference member to acquire white image data and configured to read an original document to acquire document image data. The first calibration unit is configured to calibrate shading of the document image data to generate first image data by performing comparing a density value of each pixel in the document image data to a corresponding density value of a corresponding pixel in the white image data. In addition, the first calibration unit is configured to calibrate shading of the document image data to generate first image data by performing converting a density value in the document image data to a gradation value that is proportional to the density value and falls within a predetermined range having a minimum gradation value, a maximum gradation value, and a target value less than the maximum gradation value. The density value equal to the corresponding density value is converted to the target value in the conversion. The detection unit is configured to detect pixels in the image data corresponding to an edge of the original document.

According to another aspect, the disclosure provides an image reading system including an optical sensor array, a processor, and a memory. The optical sensor array includes a plurality of optical element, and each optical element is configured to output a pixel value. The memory stores programs and the programs, when executed by the processor, causes the image reading system to execute: reading a white reference member; receiving first pixel values from the optical sensor array. Here, each first pixel value is output from each optical element when reading the white reference member. The programs read an original document, and receive second pixel values from the optical sensor array. Each second pixel value is output from each optical element when reading the original document. The programs generate third pixel values. Each third pixel value is proportional to each second pixel value respectively and being within a predetermined range. A particular third pixel value is proportional to a particular second pixel value and is a first target value within the predetermined range. The particular second pixel value is outputted from a particular optical element when reading the original document and is identical to a particular first pixel value. The particular first pixel value is outputted from the particular optical element when reading the white reference member. The programs detect edge pixels in the image data based on the third pixel values including the particular third pixel value, the edge pixels indicating an edge of the original document.

BRIEF DESCRIPTION OF THE DRAWINGS

The particular features and advantages of the disclosure will become apparent from the following description taken in connection with the accompanying drawings, in which:

FIG. 3 explains a mechanism of the white edge and its relationship to an angle of the document pressing member;

FIG. 4 explains the mechanism of the white edge, comparing with a relationship between a light source and a light receiving part;

FIG. 13A illustrates a configuration of a differential filter according to the embodiment;

FIG. 13B illustrates the configuration of the differential filter according to the embodiment;

FIG. 16 illustrates processing executed by the CPU employing the document edge according to the embodiment.

DETAILED DESCRIPTION

Figure 1:
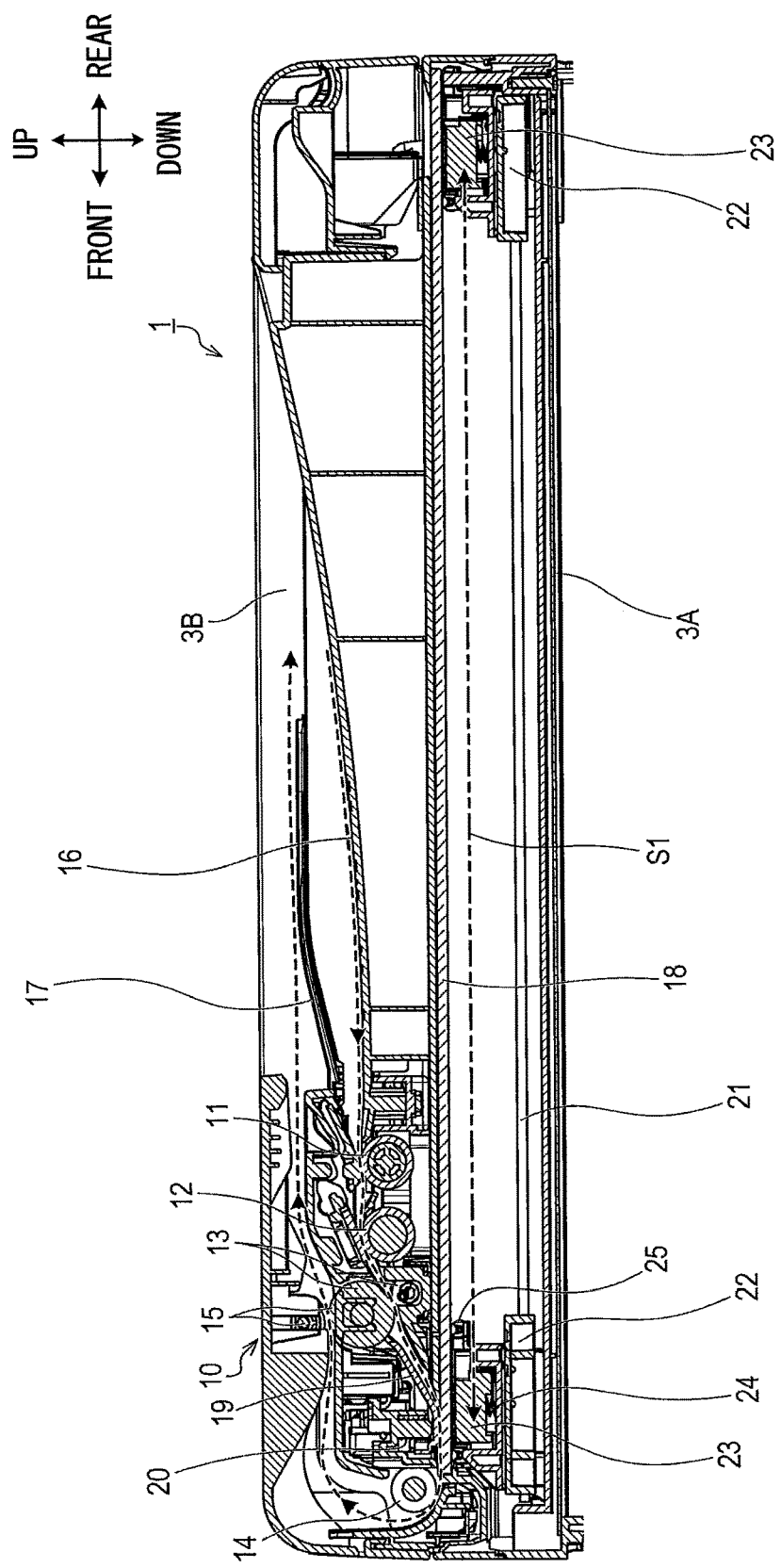
FIG. 1 is a cross-sectional view of a multifunction machine according to an embodiment.

An image reading system according to an embodiment will be described while referring to the accompanying drawings wherein like parts and components are designated by the same reference numerals to avoid duplicating description.

Figure 2:
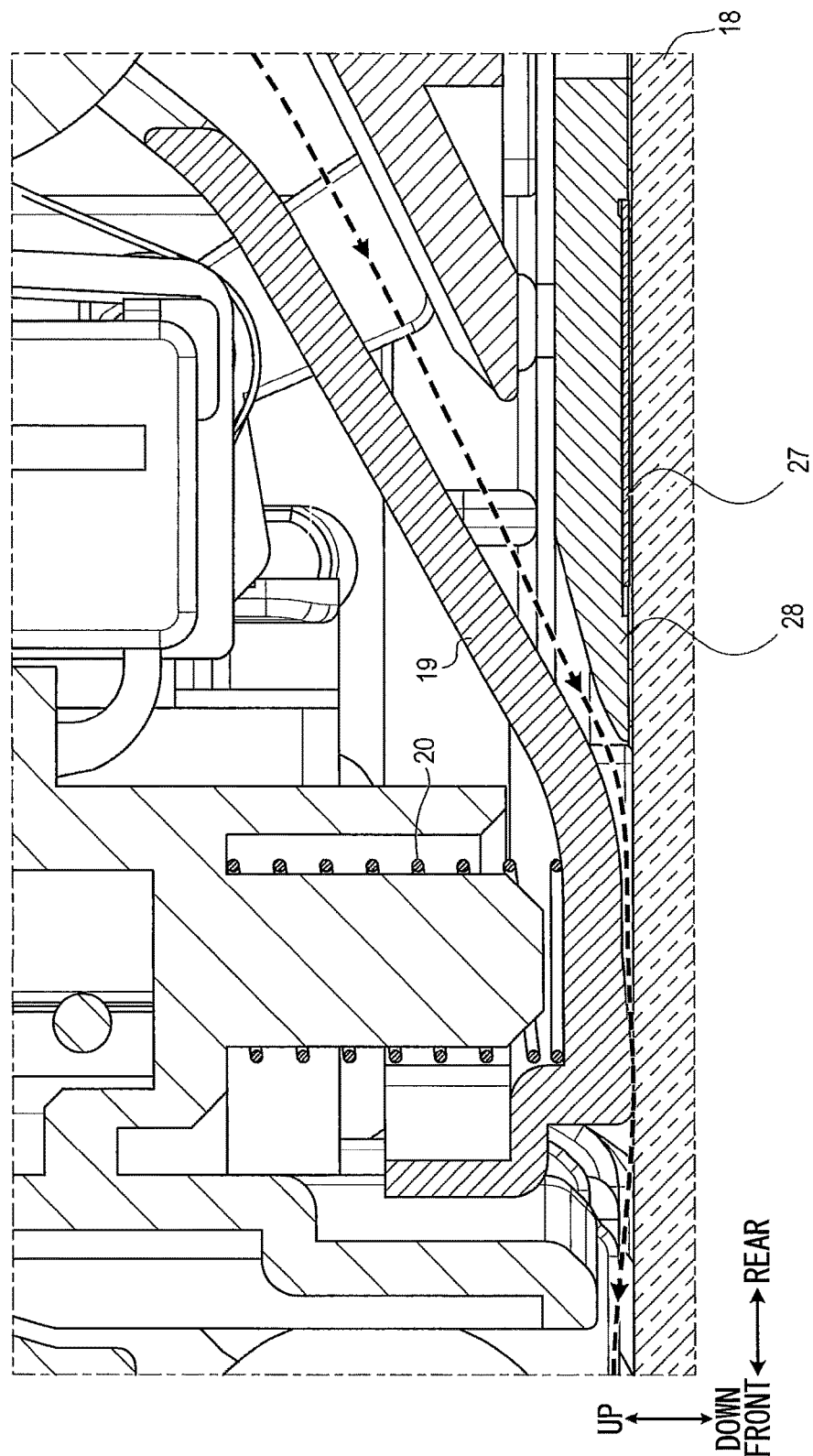
FIG. 2 is an enlarged view of a document pressing member in the multifunction machine according to the embodiment.

The terms "upward", "downward", "upper", "lower", "above", "below", "beneath", "right", "left", "front", "rear" and the like will be used throughout the description assuming that the multifunction machine 1 is disposed in an orientation in which it is intended to be used, as illustrated in FIGS. 1 and 2.

A multi-function device 1 shown in FIG. 1 is a typical example of the image reading system, and functions as a scanner device, a printing device, and a copying machine. The multi-function device 1 has an upper portion provided with a mechanism of a scanner device as shown in FIG. 1. The multi-function device has a lower portion (not shown in FIG. 1) provided with a mechanism of the printing device.

The multi-function device 1 has the structure for the scanner device including a flat-bed portion 3A and a cover portion 3B. The cover portion 3B is supported to the flat-bed portion 3A such that the cover portion 3B can be opened and closed with respect to the flat-bed portion 3A. In the closing state of the cover portion 3B, an upper surface of the flat-bed portion 3A is covered by the cover portion 3B.

The cover portion 3B is provided with a conveying section 10 that conveys an original document Q along a conveying passage as indicated by a broken line in FIG. 1. The conveying section 10 includes a supply roller 11, a separation roller 12, a pair of relay rollers 13, a U-turn conveyer roller 14, and a pair of discharge rollers 15. The cover portion 3B is further provided with a supply tray 16 and a discharge tray 17.

The original document Q mounted on the supply tray 16 is conveyed along the conveying passage and is discharged onto the discharge tray 17. The original document Q supplied from the supply tray 16 by the supply roller 11 is conveyed in a conveying direction or downstream direction. If a plurality of original documents are supplied from the supply tray 16, the separation roller 12 separates one original document from remaining document. The original document Q is then conveyed in the downstream direction by the pair of relay rollers 13 and the U-turn roller 14, and is discharged onto the discharge tray 17 by the pair of discharge rollers 15.

The cover portion is further provided with an original document presser 19, and a spring 20 urging the presser 19. The presser 19 is positioned between the pair of relay rollers 13 and the U-turn roller 14 and in confrontation with a platen glass 18. The presser 19 is adapted to press the original document Q conveyed along the conveying passage toward the platen glass 18 for uplift prevention of the original document Q from the platen glass 18. The platen glass 18 is adapted to close an opening of the flat-bed portion 3A, and is made from a transparent material.

The original document Q conveyed along the conveying passage is moved past a lower side of the presser 19 while the original is in sliding contact with an upper surface of the platen glass 18.

As shown in FIG. 1, the flat-bed portion 3A includes a guide portion 21, a carriage 22, a line sensor 23, a spring 24, and a spacer 25. The guide portion 21 extends in the frontward/rearward direction. The carriage 22 is supported to the guide portion 21 and is reciprocally movable in the frontward/rearward direction. The carriage 22 is connected to a timing belt (not shown), so that the carriage 22 is reciprocally movable in the frontward/rearward direction along the guide portion 21, i.e., in a direction indicated by an arrow S1 in accordance with circular movement of the timing belt.

The line sensor 23 is mounted on the carriage 22, and is a contact image sensor (CIS) in which a plurality of light receiving elements is arrayed in line in a direction normal to a drawing sheet. The direction of the array will be referred to as a main scanning direction.

The line sensor 23 is reciprocally movable in the frontward/rearward direction together with the movement of the carriage 22. FIG. 1 shows a frontmost position and a rearmost position of the carriage 22 and the line sensor 23 for simplicity, even though only one carriage 22 and only one line sensor 23 are provided in the embodiment.

The spring 24 is interposed between the line sensor 23 and the carriage 22, and the spacer 25 is provided to the line sensor 23. The line sensor 23 and the spacer 25 are urged upward by the biasing force of the spring 24, and the spacer 25 is in contact with a lower surface of the platen glass 18. Thus, the spacer 25 maintains the contact with the lower surface of the platen glass 18 during reciprocal movement of the line sensor 23 and the carriage 22, so that a uniform distance or gap can be provided between the line sensor 23 and the platen glass 18 during reciprocal movement of the line sensor 23.

The multifunction machine 1 has a flat-bed reading mode and an ADF reading mode. The flat-bed reading mode is a reading mode for reading an image on a document Q placed on an upper surface of the platen glass 18. In the flat-bed reading mode, the carriage 22 is conveyed in the front-rear direction. The line sensor 23 reads the document Q placed on the upper surface of the platen glass 18 while moving together with the carriage 22.

The ADF reading mode is a reading mode for reading the document Q while conveying the document Q by the conveying section 10. In the ADF reading mode, the line sensor 23 stops at a position opposite to the presser 19 in the vertical direction. The line sensor 23 reads the document Q conveyed by the conveying section 10 at this point. That is, the multifunction machine 1 reads the document Q while changing a relative position between the document Q and the line sensor 23 in a direction perpendicular to the abovementioned main scan direction. Hereinafter, the relative movement direction perpendicular to the main scan direction is also referred to as "sub-scan direction".

Additionally, the presser 19 has a white surface as a surface opposite to the platen glass 18. That is, when the document Q passing below the presser 19 is read by the line sensor 23, a background color of the document Q is white.

As can be seen from an enlarged view of FIG. 2 illustrating a portion around the presser 19, a white reference member 27 and a white reference pressing member 28 for fixing the white reference member 27 are provided at a position on the platen glass 18 that is slightly apart from the presser 19. The line sensor 23 reads the white reference member 27 before reading the document Q to generate white reference data and black reference data required for shading calibration.

As illustrated in FIG. 3, the line sensor 23 includes a light source 23A, a light receiving part 23B, and another optical system 23C. The light receiving part 23B has a configuration in which light receiving elements corresponding to respective pixels are arranged in the main scan direction as described above. The light source 23A is disposed downstream of the light receiving part 23B in the conveying direction of the document Q. The light source 23A is configured to emit light diagonally upward from the downstream to upstream and illuminates through the platen glass 18 the document Q passing below the presser 19.

When the line sensor 23 emits light from the light source 23A to read the document Q, the read image data of the document Q generated by the reading operation of the line sensor 23 includes a document edge. Here, a feature of the document edge included in the read image data obtained in the ADF reading mode will be described.

In the present embodiment, the light source 23A is disposed so as to illuminate the document Q from the downstream in the conveying direction of the document Q, so that the document edge appears as a white edge in the read image data of the document Q. In the read image data, a document region where the document Q exists and a non-document region where the document Q does not exist adjoin each other with the white edge as a boundary, and the white edge appears as a brighter region (in other words, a region having a higher density or luminance) than the non-document region.

The reason that the white edge appears brighter than surrounding pixels is unclear, but it can be considered that when the document edge passes below the presser 19, a light path from the light source 23A is changed in a direction in which reflected light gathers to the light receiving part 23B. For example, as illustrated in an upper part of FIG. 3, at an initial stage when the document Q enters below the presser 19, the presser 19 is lifted by the thickness of the document Q. As a result, a lower surface of the presser 19 is inclined relative to the platen glass 18. After the document Q enters below the presser 19 to a certain range, the lifting of the presser 19 is eliminated as illustrated in a lower part of FIG. 3, resulting in elimination of the inclination of the lower surface. Before and after the elimination of the inclination, an amount of light that enters the light receiving part 23B is significantly varied, resulting in a temporary increase in the light receiving amount of the light receiving part 23B. This may be a cause that makes the white edge appear brighter than the surrounding pixels.

There may be another reason. That is, as illustrated in FIG. 4, a side wall of the document is inclined relative to the platen glass 18, not vertical thereto, by a force applied from the presser 19, so that the light receiving amount of the light receiving part 23B is increased by reflected light from the inclined side wall, which makes the while edge appear brighter than the surrounding pixels.

Figure 5:
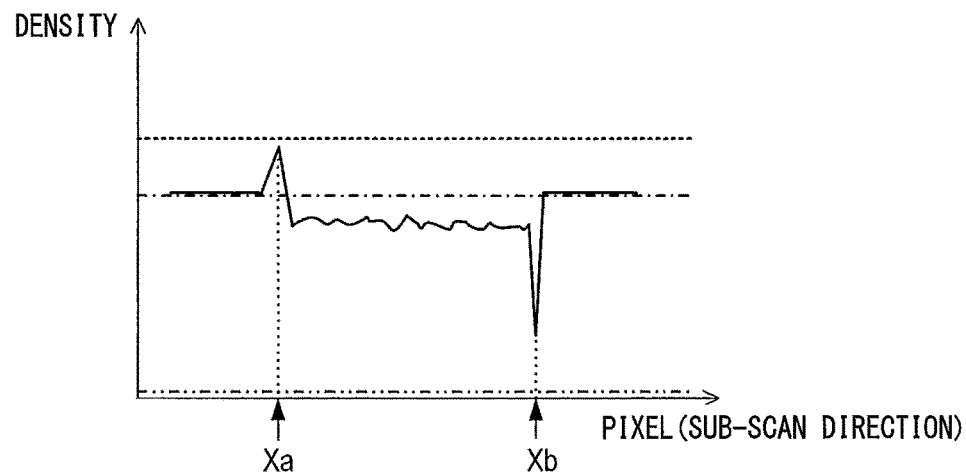
FIG. 5 is a graph indicating a relationship between a density value and pixels in a sub-scan direction.

FIG. 5 illustrates a variation in the density (in other word, luminance) in the read image data. In FIG. 5, the horizontal axis represents pixels in the read image data arranged in the sub-scan direction, and the vertical axis represents the density. A position Xa in FIG. 5 corresponds to the leading end edge, and a position Xb corresponds to the rear end edge. A region between the position Xa and the position Xb corresponds to the document region, and the remaining region corresponds to the non-document region. The density of the non-document region corresponds to the density of the lower surface of the presser 19.

A dashed dotted line in FIG. 5 corresponds a density of the white reference member 27 obtained when the line sensor 23 illuminates the white reference member 27 using the light source 23A to read the white reference member 27. That is, the dashed dotted line corresponds to a density of the white reference data. A dashed double-dotted line in FIG. 5 corresponds a density of the white reference member 27 obtained when the line sensor 23 reads the white reference member 27 without turning on the light source 23A, that is, corresponds to a density of the black reference data.

In the shading calibration, a density value of each pixel represented by the read image data of the document Q is converted into a gradation value of a predetermined number of bits (e.g., 8-bit). At this time, in conventional shading calibration, the above conversion is performed in such a way that a maximum gradation value is exhibited at the density of the white reference data and a minimum gradation value (0) at the density of the black reference data.

Such conventional shading calibration is effective to express the document Q in a wide gradation in the read image data; on the other hand, the density value of the white edge at the position Xa is converted into the maximum gradation value similarly to the surrounding pixels. As a result, the feature that the white edge is brighter than the surrounding pixels is lost by shading calibration. This makes it difficult to detect the white edge as the document edge in the read image data after shading calibration.

To increase the accuracy of detecting the document edge in the shading calibration, the multifunction machine 1 according to the embodiment performs the shading calibration so as to convert a density value equal to or larger than a peak value of the white edge indicated by a dotted line in FIG. 5 into the maximum gradation value. Then, based on the read image data after the shading calibration, the document edge is detected. Hereinafter, a configuration of the multifunction machine 1 including such a feature will be described more in detail.

Figure 6:
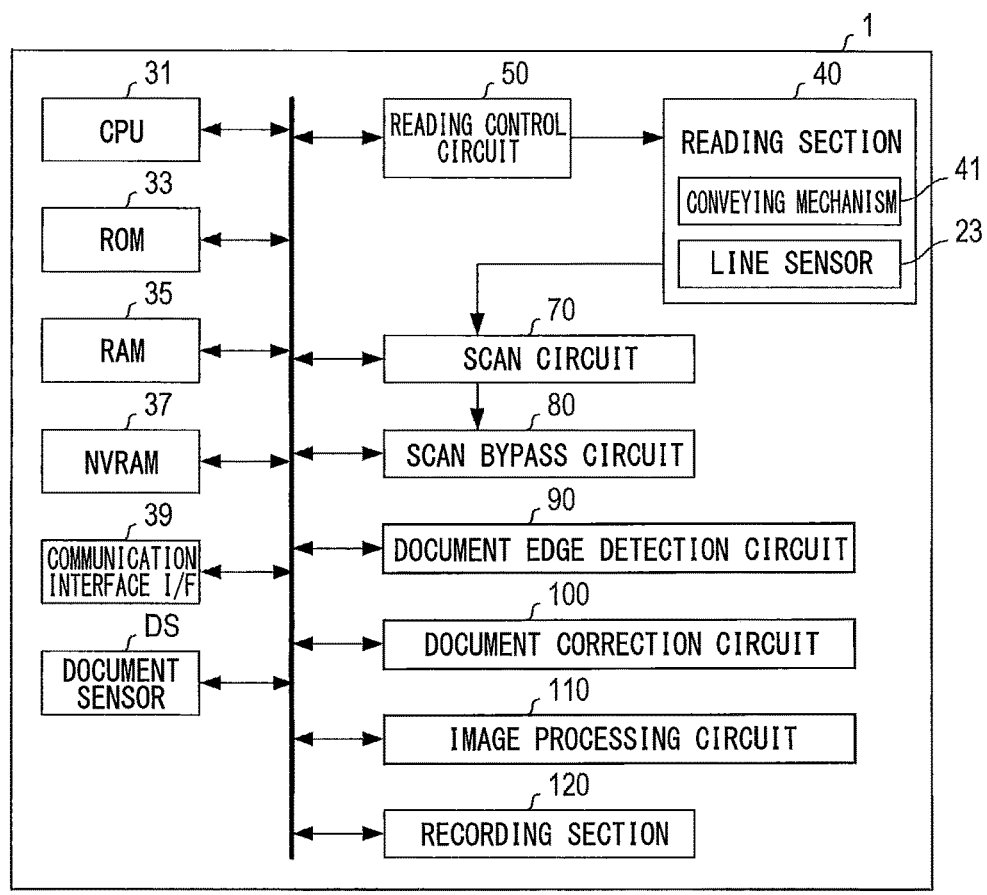
FIG. 6 is a block diagram illustrating an electrical configuration of the multifunction machine according to the embodiment.

As illustrated in FIG. 6, the multifunction machine 1 according to the present embodiment includes a CPU 31, a ROM 33, a RAM 35, an NVRAM 37, a communication interface 39, a reading section 40, a reading control circuit 50, a scan circuit 70, a scan bypass circuit 80, a document edge detection circuit 90, a document correction circuit 100, an image processing circuit 110, and a recording section 120.

The CPU 31 executes processing according to a program recorded in the ROM 33 to integrally control the entire multifunction machine 1. The ROM 33 stores data used for the program together with the program. The RAM 35 is used as a working memory when processing is executed by the CPU 31. The NVRAM 37 is a memory in which data can be electrically rewritten and is, e.g., a flash memory. The communication interface 39 can communicate with an external device. Through the communication interface 39, the multifunction machine 1 can receive an instruction from the external device and transmit multi-gradation image data of the document generated through reading operation to the external device.

The reading section 40 includes the line sensor 23 and a conveying mechanism 41. The conveying mechanism 41 includes a mechanism that conveys the above-described carriage 22 in the sub-scan (front-rear) direction and a mechanism (conveying section 10) that conveys the document Q in the sub-scan direction.

The reading control circuit 50 controls the line sensor 23 and conveying mechanism 41, following an instruction from the CPU 31. The scan circuit 70 converts the read image data of the document Q input thereto from the line sensor 23 from an analog signal to a digital signal and applies shading calibration and gamma correction to the read image data after conversion to generate multi-gradation image data of the document Q and then records the generated multi-gradation image data in the RAM 35.

The scan bypass circuit 80 applies gamma correction suitable for document edge detection to the read image data after shading calibration input thereto from the scan circuit 70 and records the read image data after gamma correction in the RAM 35 as image data for edge detection.

The document edge detection circuit 90 reads out, from the RAM 35, the image data for edge detection generated by the scan bypass circuit 80 and sequentially applies, to the image data for edge detection, moving average processing, differential processing, and binarization processing. The document edge detection circuit 90 extracts, from the image data for edge detection after binarization processing, a group of edge pixels which are estimated to constitute the document edge. The document edge detection circuit 90 then records, in the RAM 35, edge position data representing a position of the edge pixel group.

The CPU 31 calculates an approximate straight line of the edge pixel group based on the edge position data to detect the approximate straight line as the document edge. Further, based on position information of the document edge, operation parameters are set in the document correction circuit 100. For example, the CPU 31 sets operation parameters for correction processing of inclination of the document Q and those for extraction processing of the document Q.

The document correction circuit 100 reads out the multi-gradation image data of the document Q recorded in the RAM 35 and executes, in accordance with an instruction from the CPU 31, one of correction processing of inclination of the document Q with respect to the multi-gradation image data and extraction processing of image data of a region corresponding to the document Q from the multi-gradation image data. The document correction circuit 100 records the resultant image data in the RAM 35.

The image processing circuit 110 executes compression processing to the resultant multi-gradation image data recorded in the RAM 35 by the document correction circuit 100 to convert the multi-gradation image data into, e.g., JPEG compression image data. The image processing circuit 110 records the multi-gradation image data in the RAM 35 after the conversion. The image processing circuit 110 may record the above multi-gradation image data in the NVRAM 37, instead of the RAM 35.

The recording section 120 prints, according an instruction from the CPU 31, the multi-gradation image data recorded in the RAM 35 or NVRAM 37 or image data input thereto from an external device through the communication interface 39 on a paper sheet. The recording section 120 is, e.g., an inkjet printer or a laser printer.

Figure 7:
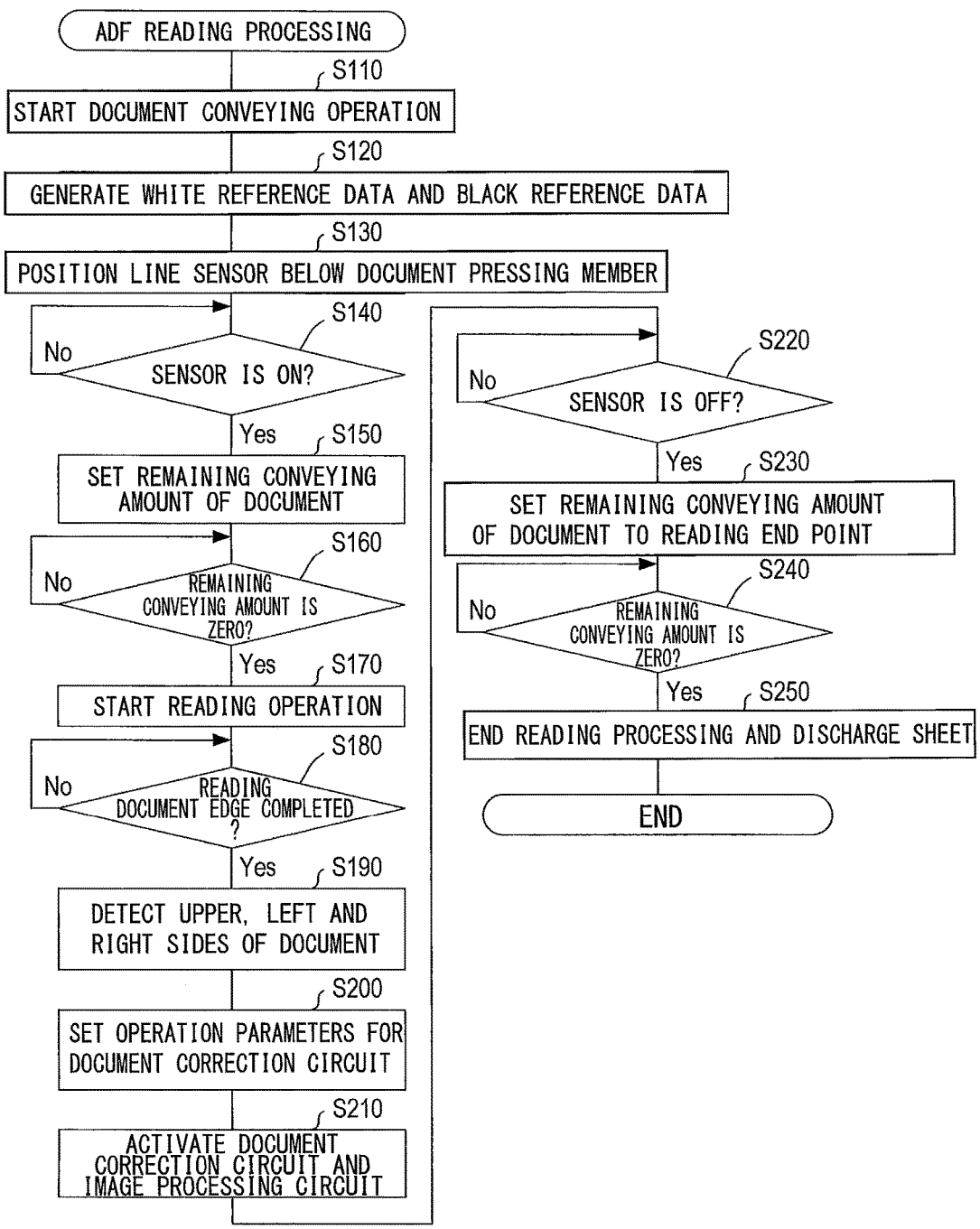
FIG. 7 is a flow chart illustrating steps in ADF reading processing performed by a CPU according to the embodiment.

The following describes ADF reading processing executed by the CPU 31 using FIG. 7. The ADF reading processing is executed by the CPU 31 when the document Q is read in the above-mentioned ADF reading mode. The CPU 31 executes the ADF reading processing based on an instruction input thereto from an external device through the communication interface 39 or an instruction input thereto from a user through an unillustrated user interface.

After starting the ADF reading processing, the CPU 31 controls the conveying section 10 through the reading control circuit 50 to start conveying operation of the document Q from the supply tray 16 (S110). Thereafter, the CPU 31 moves the line sensor 23 below the white reference member 27 and controls the line sensor 23 through the reading control circuit 50 so as to execute processing of reading the white reference member 27 with the light source 23A tuned on. Further, the CPU 31 also executes processing of reading the white reference member 27 without turning on the light source 23A (S120). Through the reading processing, the line sensor 23 generates the white reference data and black reference data. The generated white reference data and black reference data are retained in the scan circuit 70 for shading calibration.

Thereafter, the CPU 31 moves the line sensor 23 below the presser 19 by employing the reading control circuit 50 (S130) and waits until a document sensor DS outputs an ON signal (S140).

The document sensor DS is provided upstream of the reading point below the presser 19 in the conveying direction of the document Q. The document sensor DS switches the output signal from an OFF signal to an ON signal when the leading end of the document Q passes therethrough. The document sensor DS outputs the ON signal as the output signal until the rear end of the document Q passes therethrough and outputs the OFF signal as the output signal after the rear end of the document Q passes therethrough.

When the output signal from the document sensor DS is switched from the OFF signal to the ON signal (Yes in S140), the CPU 31 determines that the leading end of the document Q approaches the reading point of the line sensor 23 and sets the remaining conveying amount of the document Q to the reading start point (S150). At a time when the document Q is conveyed by the set remaining conveying amount (Yes in S160), the CPU 31 controls the line sensor 23 through the reading control circuit 50 to start reading operation (S170). Upon start of the reading operation, the CPU 31 activates the scan circuit 70, scan bypass circuit 80, and document edge detection circuit 90.

Thereafter, the CPU 31 waits until the edge position data is recorded in the RAM 35 by the document edge detection circuit 90 (S180). When the edge position data is recorded (Yes in S180), the CPU 31 calculates the approximate straight line based on the edge position data to detect an upper, left and right sides of the document Q as the document edge (S190). Further, the CPU 31 detects the position and inclination of the document Q based on the detected upper, left, and right sides of the document Q and sets, in the document correction circuit 100, the operation parameters for correction processing of the document inclination (S200). When determining based on an instruction issued previously from a user that he or she wishes to extract the document Q, the CPU 31 sets, in the document correction circuit 100, the operation parameters for extraction processing of the document Q. Examples of the operation parameters include parameters representing an image rotating amount and parameters representing an extraction target image region.

The CPU 31 activates the document correction circuit 100 and image processing circuit 110 (S210) and waits until the output signal from the document sensor DS is switched to the OFF signal (S220). When the output signal from the document sensor DS is switched to the OFF signal (Yes in S220), the CPU 31 determines that the rear end of the document Q approaches the reading point of the line sensor 23 and sets the remaining conveying amount of the document Q to the reading end point (S230).

At a time when the document Q is conveyed by the remaining conveying amount (Yes in S240), the CPU 31 controls the line sensor 23 through the reading control circuit 50 to end the reading processing (S250).

The CPU 31 controls the conveying section 10 through the reading control circuit 50 to execute discharging operation of the document Q. Thereafter, the ADF reading processing is ended. For descriptive simplicity, the ADF reading processing has been described taking a case where the number of the documents Q is one. When a plurality of the documents Q are continuously read, the CPU 31 starts conveying operation of a new document Q simultaneously with discharging operation of the preceding document Q and thereafter shifts to step S140, where the CPU 31 executes the same processing as that for the preceding document Q.

Figure 8:
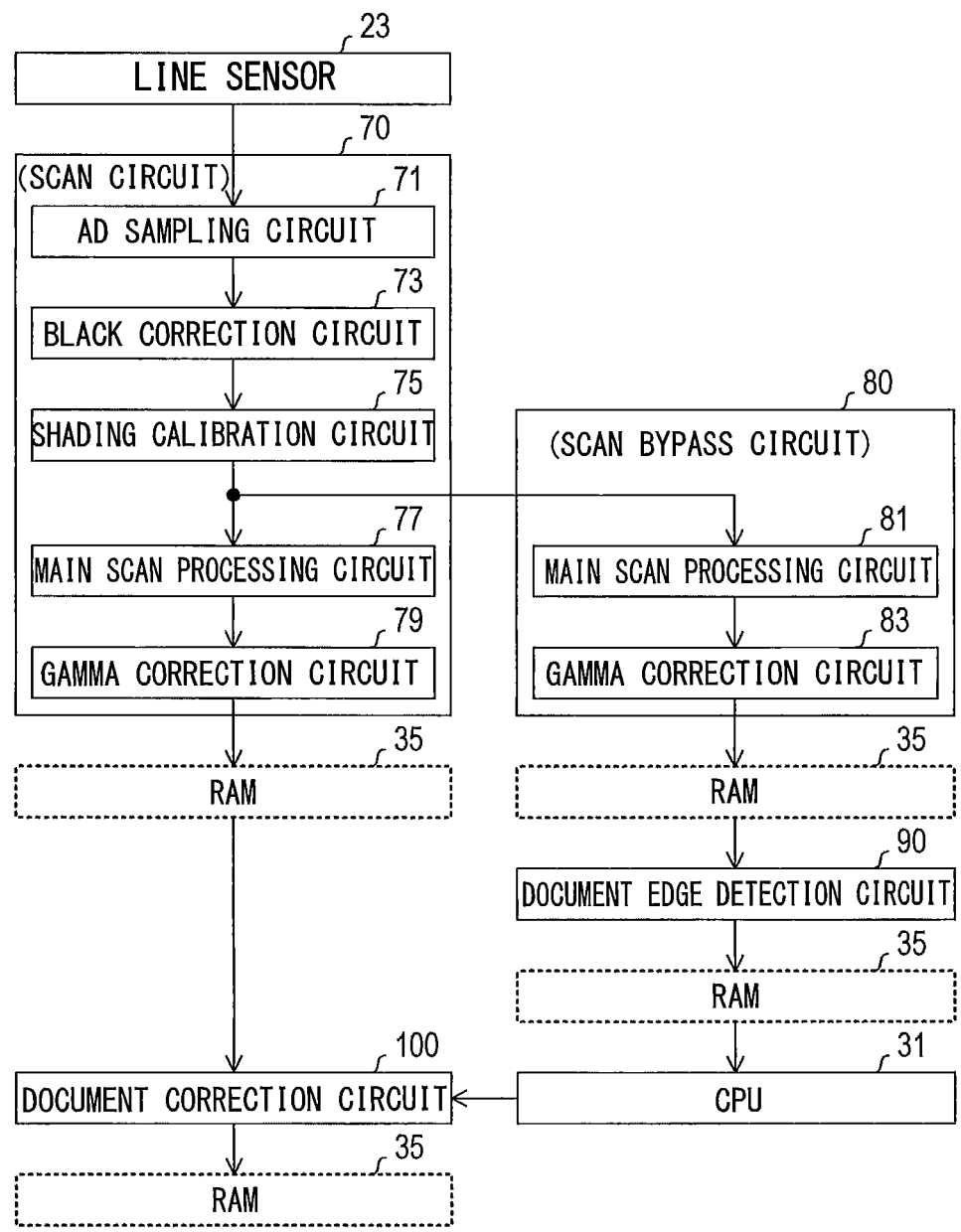
FIG. 8 illustrates configurations of a scan circuit and a scan bypass circuit according to the embodiment.

The following describes in detail configurations and operations of the scan circuit 70 and scan bypass circuit 80. As illustrated in FIG. 8, the scan circuit 70 includes an AD sampling circuit 71, a black correction circuit 73, a shading calibration circuit 75, a main scan processing circuit 77, and a gamma correction circuit 79. The AD sampling circuit 71 converts the read image data of the document Q in the form of an analog signal input thereto from the line sensor 23 into data in the form of a digital signal. The digital read image data thus obtained by the AD sampling circuit 71 is input to the black correction circuit 73. The AD sampling circuit 71 may include various processing circuits for the analog signal.

The black correction circuit 73 corrects the density value of each pixel represented by the input read image data by referring to a density value of each pixel represented by the black reference data. The black reference data represents, as the density value of each pixel in the main scan direction, a density value of the white reference member 27 read by the light receiving part 23B without turn-on of the light source 23A. That is, the black correction circuit 73 subtracts, from the density value of each pixel represented by the read image data, a density value of the same pixel in the main scan direction represented by the black reference data. The read image data after black correction by the black correction circuit 73 is input to the shading calibration circuit 75.

The shading calibration circuit 75 applies shading calibration to the read image data after black correction based on the white image data. The white image data corresponds to data obtained by applying the black correction to the white reference data based on the black reference data. In the white image data, the density value of each pixel in the main scan direction is represented by a value obtained by subtracting, from a density value represented by the white reference data, a density value of the same pixel in the main scan direction represented by the black reference data.

The shading calibration circuit 75 performs the shading calibration based on the white imaged data to generate calibrated image data in which the density value of each pixel represented by the read image data after black correction has been converted into a gradation value of a predetermined bit. Through the shading calibration, the density value of each pixel represented by the read image data is converted into a gradation value proportional to the density value in a range of possible gradation values.

Additionally, in the read image data after black correction, the shading calibration circuit 75 of the present embodiment converts the density value of a pixel representing a density value coinciding with the density value of the same pixel in the white image data into a target gradation value Gt that is smaller than the maximum gradation value and is proportional to the density value. In this manner, the shading calibration circuit 75 converts the density value of each pixel represented by the read image data after black correction into the gradation value proportional to the density value in a range of possible gradation values. In the calibration, the density value coinciding with the density value of the same pixel in the white image data is converted into a gradation value smaller than the maximum gradation value. In the conventional shading calibration, the density value of each pixel of the read image data is converted into the gradation value so that the density value of the read image data coinciding with the density value of the white image data is converted into the maximum gradation value. In this point, the present embodiment differs from the conventional approach.

The target gradation value Gt is defined to satisfy the following inequality: $Gt \times (Cp/Cw) \leq Gp$, where $Cp/Cw$ is a ratio between a peak value Cp of the density of the white edge in the read image data after black correction and a density value Cw of the white image data, and Gp is the maximum gradation value.

As a result of setting the target gradation value Gt that satisfies this inequality, the white edge is hindered from being saturated at the maximum gradation value in the read image data after shading calibration.

The density value of the white edge in the read image data has the peak value Cp, which is varied for each reading operation of the document Q. Therefore, based on statistics of the peak values Cp collected by tests, the target gradation value Gt is set so that a probability that the density value of the white edge is saturated at the maximum gradation value Gp is reduced to a certain level. According to the empirical rule, the target gradation value Gt can be set to a value 10% smaller than the maximum gradation value Gp.

Based on the target gradation value Gt, the shading calibration circuit 75 converts a density value C of each pixel into a gradation value G proportional to the density value C in accordance with the equation: $G = C \times (Gt/Cw)$.

The density value Cw used is a density value of the same pixel as a conversion target represented by the white image data. According to the equation, a value obtained by multiplying the density value Cp of a pixel exhibiting the largest density value in the read image data by a coefficient (Gt/Cw), that is, a value obtained by substituting the density value Cp in the above relational expression is basically equal to or smaller than the maximum gradation value. Thus, in the read image data after shading calibration, the white edge is not saturated at the maximum gradation value, and the information that the white edge is brighter than the surrounding pixels is not lost.

The calibrated image data, i.e., the read image data after shading calibration outputted from the shading calibration circuit 75 is inputted to the main scan processing circuit 77 of the scan circuit 70 and to a main scan processing circuit 81 of the scan bypass circuit 80. As illustrated in FIG. 8, the scan bypass circuit 80 includes a main scan processing circuit 81 and a gamma correction circuit 83.

The main scan processing circuit 77 of the scan circuit 70 executes noise reduction processing and thinning processing in the main scan direction for the calibrated image data inputted thereto from the shading calibration circuit 75 and inputs the resultant calibrated image data to the gamma correction circuit 79. The noise reduction processing corresponds to, e.g., processing of reducing moire. The thinning processing corresponds to processing of thinning pixel data in the calibrated image data so as to convert the calibrated image data into image data of a specified resolution.

Figure 9:
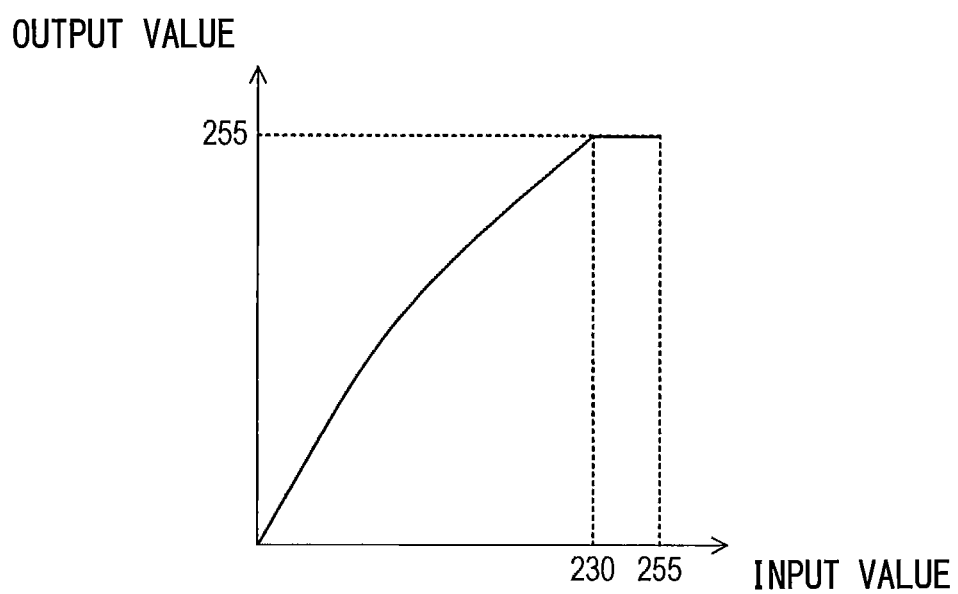
FIG. 9 is a graph illustrating input/output characteristics of a gamma correction circuit in the scan circuit according to the embodiment.

The gamma correction circuit 79 applies gamma correction to the calibrated image data inputted thereto from the main scan processing circuit 77. The gamma correction circuit 79 applies the gamma correction to the calibrated image data according to a gamma table having input/output characteristics of FIG. 9. In the gamma table of FIG. 9, the gradation value is represented by 8 bits. The maximum value of the gradation value represented by 8 bits, i.e., the maximum gradation value is 255, and the minimum gradation value is 0. In FIG. 9, the target gradation value Gt is set to 230.

In the manner determined by the input/output characteristics of FIG. 9, the gradation value of each pixel in the calibrated image data as an input value is corrected as follows. That is, in the calibrated image data, gradation values (from 231 to 255) larger than the target gradation value Gt are corrected to the maximum gradation value (255). On the other hand, gradation values (from 0 to 230) equal to or smaller than the target gradation value Gt are corrected to gradation values in a range of the minimum gradation value (0) to the maximum gradation value (255) in such a way that a magnitude relationship thereamong is not changed before and after the correction.

According to the example of the calibration in FIG. 9, the target gradation value (230) in the corrected imaged data is corrected to the maximum gradation value (255) larger than the target gradation value. The gradation values represented by a range from the minimum gradation value to the target gradation value (from 0 to 230) before gamma correction are corrected to gradation values of a wider range (from 0 to 255) than that before gamma correction, and gradation values of a range from the target gradation value to the maximum gradation value (from 230 to 255) before gamma correction are corrected to gradation values of a narrower range (255) than that before gamma correction.

By the gamma correction, the density value of the read image data of the document Q larger than that of the white image data is corrected to the maximum gradation value, and thus the document image is expressed in a wide gradation using gradation values of the entire range. The gamma correction circuit 79 records the thus generated calibrated image data after gamma correction in the RAM 35 as multi-gradation image data of the document Q in which each pixel is represented by a gradation value of a predetermined bit number.

In the scan bypass circuit 80, the calibrated image data input from the scan circuit 70 is processed by the main scan processing circuit 81 and then inputted to the gamma correction circuit 83. Like the main scan processing circuit 77 of the scan circuit 70, the main scan processing circuit 81 of the scan bypass circuit 80 applies the noise reduction processing and thinning processing to the calibrated image data.

Figure 10A:
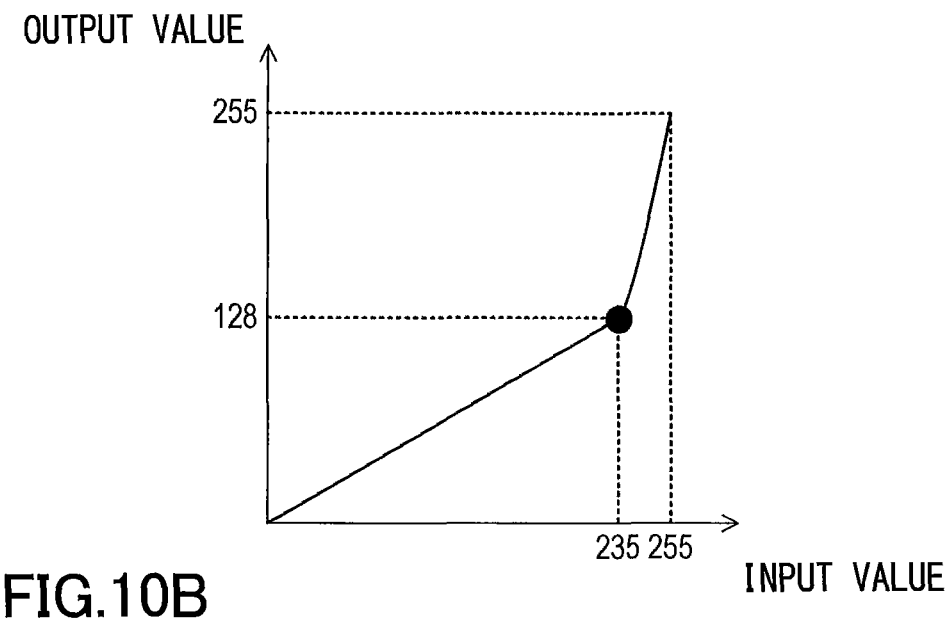
FIG. 10A is a first example of the input/output characteristics of a gamma correction circuit in the scan bypass circuit according to the embodiment.

The gamma correction circuit 83 applies gamma correction to the calibrated image data inputted thereto from the scan circuit through the main scan processing circuit 81, employing a gamma table different from that used in the scan circuit 70. Specifically, the gamma correction circuit 83 applies the gamma correction to the calibrated image data in accordance with a gamma table having input/output characteristics of FIG. 10A. A gradation value of 235 of FIG. 10A corresponds to a gradation value of the non-document region in the calibrated image data, that is, corresponds to a gradation value of a flat region in FIG. 5, in other words, the lower surface of the presser 19. Hereinafter, the gradation value of 235 is also referred to as a background gradation value. In FIG. 10A, the target gradation value Gt is set to 230 as in FIG. 9.

According to the input/output characteristics of FIG. 10A, the gradation value of each pixel in the calibrated image data is corrected as follows. That is, the target gradation value Gt and the background gradation value (235) are each corrected to smaller gradation values. For example, the target gradation value Gt (230) is corrected to a gradation value of 125, and the background gradation value (235) is corrected to a gradation value of 128. Thus, the gradation values represented by a range from the minimum gradation value to the background gradation value (from 0 to 235) are corrected to gradation values of a narrower range (from 0 to 128), and gradation values of a range from the background gradation value to the maximum gradation value (from 235 to 255) are corrected to gradation values of a wider range (from 128 to 255) by the gamma correction. However, gradation values (from 0 to 255) of the entire range are corrected in such a way that a magnitude relationship thereamong is not changed before and after the correction.

As can be seen from FIG. 10A, output values corresponding to input values of a range from 235 to 255 abruptly increase. As a result, a pixel corresponding to the white edge in the calibrated image data is corrected by the gamma correction circuit 83 so as to be emphasized more than the surrounding pixels. Through the gamma correction, the gamma correction circuit 83 converts the input calibrated image data into image data suitable for document edge detection. Hereinafter, the calibrated image data after the gamma correction by the gamma correction circuit 83 is referred to as edge detecting image data. The gamma correction circuit 83 records the edge detecting image data in the RAM 35.

Figure 10B:
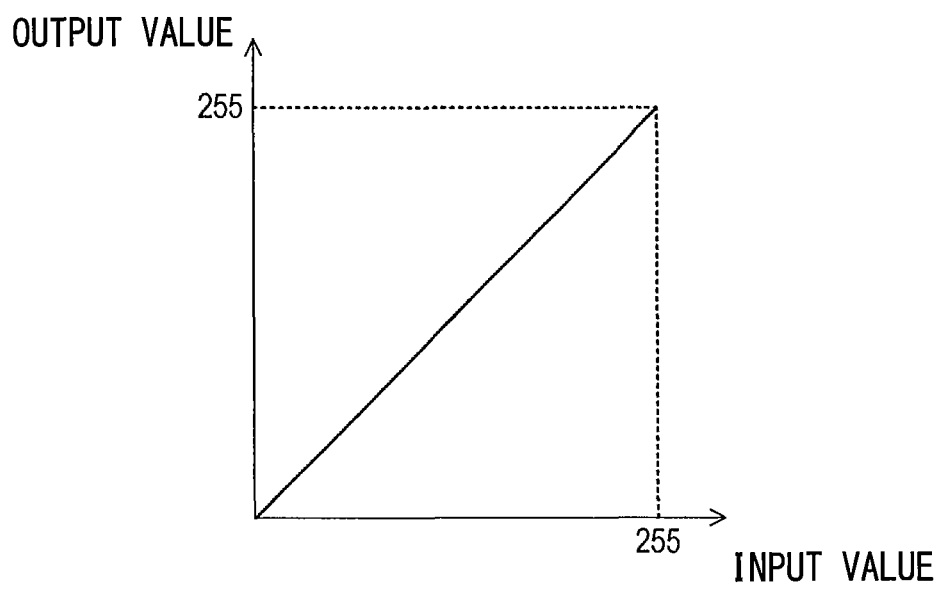
FIG. 10B is a second example of the input/output characteristics of a gamma correction circuit in the scan bypass circuit according to the embodiment.

The gamma correction circuit 83 may be configured to generate the image data for edge correction corresponding to the input corrected image in the manner determined by the input/output characteristics of FIG. 10B. As can be seen from the example of FIG. 10B, the gradation value of each pixel in the calibrated image data is output substantially unchanged from the gamma correction circuit 83. The gamma correction circuit 83 records the edge detecting image data as the resultant data of the correction. In other words, the gamma correction circuit 83 outputs the calibrated image data without changing the data.

Figure 11:
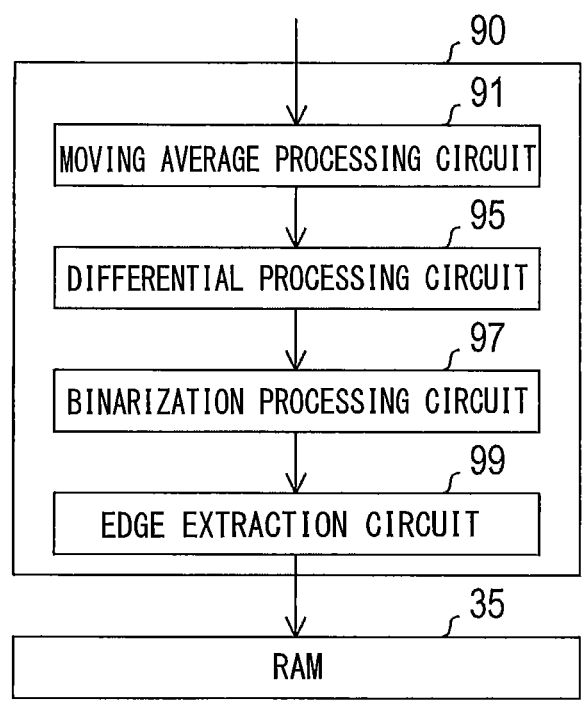
FIG. 11 is a block diagram illustrating a configuration of a document edge detection circuit according to the embodiment.

The following describes details of the document edge detection circuit 90 as illustrated in FIG. 11 that generates the edge position data based on the edge detecting image data recorded in the RAM 35. As illustrated in FIG. 11, the document edge detection circuit 90 includes a moving average processing circuit 91, a differential processing circuit 95, a binarization processing circuit 97, and an edge extraction circuit 99.

Figure 12:
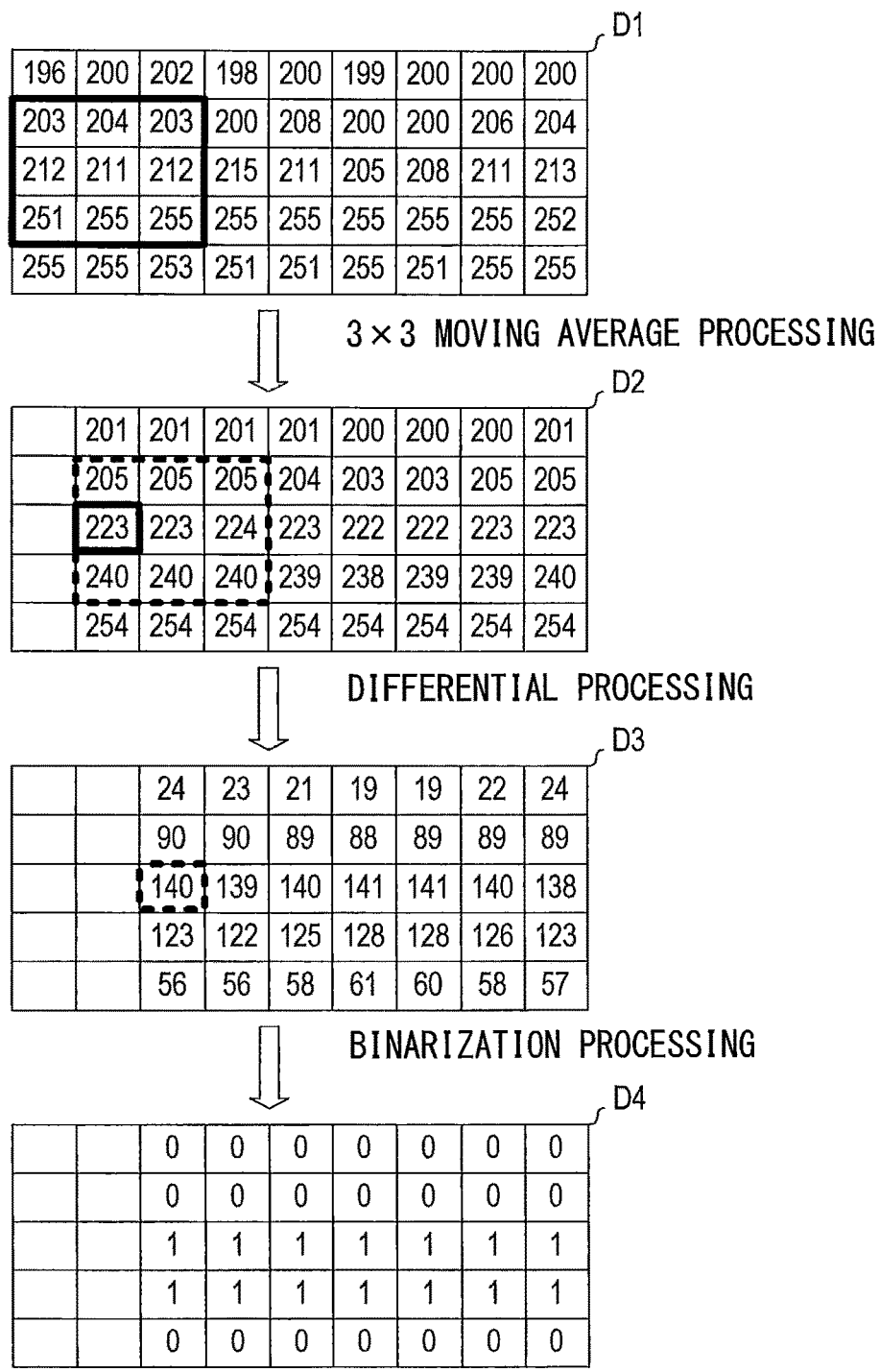
FIG. 12 explains moving average processing, differential processing, and binarization processing according to the embodiment.

The moving average processing circuit 91 is a circuit that applies 3×3 moving average processing to the edge detecting image data. As is known, in the 3×3 moving average processing, an average value of gradation values of 3×3 pixels with a target pixel as a center pixel is calculated, and image data in which a gradation value of the center pixel has been changed to the calculated average value is output as image data after moving average processing. When edge detecting image data D1 illustrated in the first diagram (the top) of FIG. 12 is subjected to the moving average processing, edge detecting image data D2 after moving average processing is configured as illustrated in the second diagram (the second from the top) of FIG. 12. The average value of the 3×3 pixels surrounded by a thick line in the first diagram of FIG. 12 appears as a gradation value of the pixel surrounded by a thick line in the edge detecting image data D2 after moving average processing illustrated in the second diagram of FIG. 12. In the second diagram of FIG. 12, numerical values corresponding to left end pixels are blank. This is because the edge detecting image data D1 illustrated in the first diagram of FIG. 12 corresponds to a leading part in the main scan direction and, thus, the corresponding numerical values do not exist. On the other hand, numerical values corresponding to upper end and lower end pixels appear in the second diagram of FIG. 12. This is because the edge detecting image data D1 illustrated in the first diagram of FIG. 12 corresponds to an intermediate part in the sub-scan direction. The numerical values corresponding to the upper end and lower end pixels in the second diagram of FIG. 12 represent values obtained by the moving average processing performed on the basis of a part of the edge detecting image data D1 that is not illustrated in the first diagram of FIG. 12.

Additionally, when the line sensor 23 is adaptable to a color image, read image data of respective colors are inputted from the line sensor 23 to the scan circuit 70 by the color reading. Then, the read image data of respective colors are individually processed by the above-described method. As a result, multi-gradation image data of respective colors from the scan circuit 70 are recorded in the RAM 35, and edge detecting image data of respective colors from the scan bypass circuit 80 are recorded in the RAM 35.

In this case, before the moving average processing, the moving average processing circuit 91 can integrate the edge detecting image data of respective colors to generate edge detecting image data in which a luminance value of each pixel is expressed with gradation. This edge detecting image data can be generated by weighting and adding the gradation values of respective pixels in the edge detecting image data of respective colors. The moving average processing circuit 91 can apply the moving average processing to the obtained edge detecting image data and output edge detecting image data after the moving average processing.

The edge detecting image data D2 after the moving average processing performed by the moving average processing circuit 91 is inputted to the differential processing circuit 95. The differential processing circuit 95 applies differential processing to the input edge detecting image data D2. After the differential processing, the differential processing circuit 95 inputs the edge detecting image data D3 to the binarization processing circuit 97.

Figures 13A, 13B:
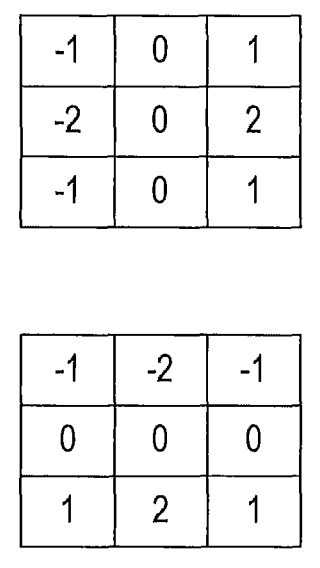

Specifically, the differential processing circuit 95 can use a Sobel filter with a kernel size of 3×3 as a differential filter in the differential processing for the edge detecting image data D2. In the differential processing using the Sobel filter, a main scan direction Sobel filter illustrated in FIG. 13A and a sub-scan direction Sobel filter illustrated in FIG. 13B can be used. The main scan direction Sobel filter is a Sobel filter for differentiating the edge detecting image data D2 in the main scan direction, and the sub-scan direction Sobel filter is a Sobel filter for differentiating the edge detecting image data D2 in the sub-scan direction. The main scan Sobel filter is useful for detecting left and right sides of the document Q, and sub-scan direction Sobel filter is useful for detecting an upper side of the document Q.

When applying differential processing to a part of the edge detecting image data D2 surrounded by a dashed line illustrated in the second diagram of FIG. 12, the differential processing circuit 95 calculates, as a center pixel value after differential processing, a root sum square $(I^2+J^2)^{1/2}$. Here, the value I is obtained by convolution operation between the 3×3 pixels surrounded by the dashed line and the main scan direction Sobel filter, and a value J is obtained by convolution operation between the 3×3 pixels surrounded by the dashed line and the sub-scan direction Sobel filter. Edge detecting image data D3 illustrated in the third diagram (the second from the bottom) of FIG. 12 is obtained by applying the differential processing to the edge detecting image data D2 illustrated in the second diagram. A part surrounded by a dashed line in the third diagram of FIG. 12 represents a value obtained by applying the differential processing to the part surrounded by the dashed line of FIG. 12.

The binarization processing circuit 97 applies binarization processing to the edge detecting image data D3 after the differential processing performed by the differential processing circuit 95. The binarization processing circuit 97 inputs edge detecting image data D4 to the edge extraction circuit 99 after the binarization processing. Specifically, the binarization processing circuit 97 compares the gradation value of each pixel represented by the edge detecting image data D3 with a threshold. Then, the binarization processing circuit 97 converts a gradation value equal to or larger than the threshold into 1 and converts a gradation value smaller than the threshold into 0 to thereby binarize the edge detecting image data D3. The edge detecting image data D4 obtained by applying the binarization processing to the edge detecting image data D3 illustrated in the third diagram of FIG. 12 is illustrated in the fourth diagram (the bottom) of FIG. 12. In the example of FIG. 12, the threshold is set to 100. The threshold is not limited to this value and may be set to any appropriate value obtained by tests.

The edge extraction circuit 99 extracts a group of edge pixels estimated as the leading edge of the document based on the edge detecting image data D4 after binarization processing and records the edge position data representing positions of the respective edge pixels in the RAM 35.

Figure 14:
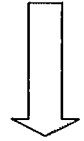
FIG. 14 illustrates edge position data generated by an edge extraction circuit according to the embodiment.

Specifically, the edge extraction circuit 99 extracts, from the edge detecting image data D4, pixels having a value of 1 as the edge pixels, which are the pixels surrounded by a thick line in the upper diagram of FIG. 14 and closest to a leading edge in the sub-scan direction. Here, the leading edge is 0-th line surrounded by a long dashed dotted line in the upper diagram of FIG. 14, and the sub-scan direction is denoted by a black arrow in the upper diagram of FIG. 14. Next, the edge extraction circuit 99 generates edge position data D5 in which a line number of each edge pixel is described as the edge position, as illustrated in the lower diagram of FIG. 14.

Figure 15A:
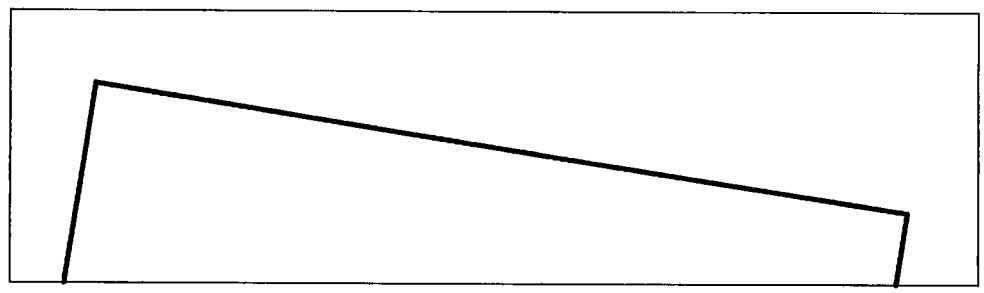
FIG. 15A illustrates disposition of a document edge according to the embodiment.

In the upper diagram of FIG. 14, a line assigned with a line number E is a final line of the edge detecting image data D4. The final line does not represent the end of the document. As illustrated in FIG. 15A, the edge detecting image data D4 corresponds to part of data obtained by the above-described method, which specifically correspond to the read image data in a range from the leading edge to a predetermined portion of the document Q. FIG. 15A is obtained by modeling the binary image represented by the edge detecting image data D4, in which the entire region surrounded by a thin line corresponds to edge detecting image data, and pixels on a thick line correspond to the edge pixels. The line number E is a line number of the final line in the edge detecting image data from the reading start to a predetermined line.

A pixel represented by a value of M in the edge position data D5 corresponds to a pixel in which a value of 1 corresponding to the edge pixel does not appear in the edge detecting image data D4 through the binarization processing. The value M represents a value larger than the line number E of the final line in the edge detecting image data. The edge position data D5 thus generated and recorded in the RAM 35 is read out by the CPU 31 and used for document edge detection in S190.

In S190, as illustrated in the first (uppermost) diagram of FIG. 16, the CPU 31 refers to the edge position data D5 from a center pixel (pixel surrounded by a long dashed dotted line in the first diagram of FIG. 16) to a pixel region where a predetermined number of pixels having the value M appear successively in a direction toward both ends of the edge position data D5 along the main scan line. When a predetermined number of pixels having the value M appear successively in the pixel region, the CPU 31 can determine that the document edge is not included in the pixel region.

Figure 15B:
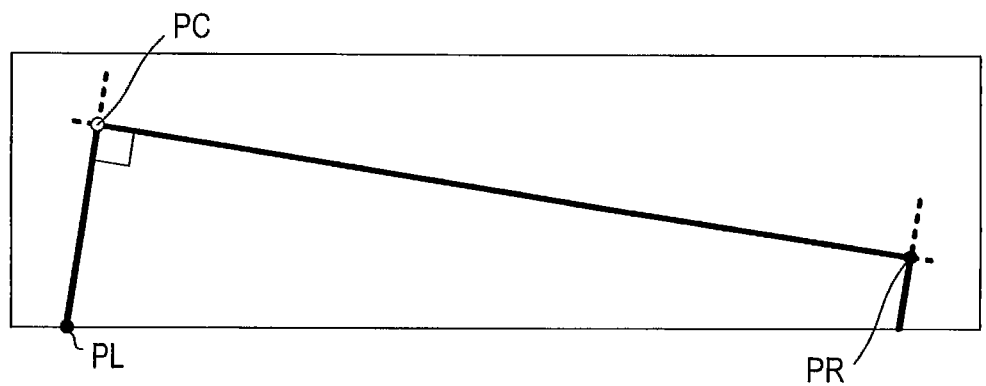
FIG. 15B illustrates a detection process of the document edge using an approximate straight line according to the embodiment.

Thus, when a predetermined number of pixels having the value M appear successively, the CPU 31 detects, as an end pixel of the document edge, pixels adjacent to the pixel group consisting of a predetermined number of pixels having the value M at the center pixel side, i.e., pixels surrounded by a thick line in the second (middle) diagram of FIG. 16. A document edge end pixel PL positioned to left side with respect to the center pixel in the edge position data D5 corresponds to an end pixel PL on the document left side in the edge detecting image data, as illustrated in FIG. 15B. Further, a document edge end pixel PR positioned at the right side with respect to the center pixel in the edge position data D5 corresponds to an end pixel PR on the document right side in the edge detecting image data, as illustrated in FIG. 15B.

The CPU 31 estimates, as edge pixels on the document upper side, an edge pixel group in a center area of the main scan direction having pixels separated by a predetermined number of pixels from the both end pixels PL, PR toward the center pixel. Note that the center area of the main scan direction is illustrated as the area surrounded by a dashed line in the second diagram of FIG. 16. Then, the CPU 31 divides the edge pixel group into a predetermined unit, illustrated as the groups each surrounded by a dashed line in the third diagram, i.e., the bottom diagram of FIG. 16. The CPU 31 detects a mid-pixel in each predetermined unit that is the pixel indicating the line number or position centered in the sub-scan direction among all the pixels in each predetermined unit, as illustrated by the thick line in the third diagram of FIG. 16. The CPU 31 selects and uses the center pixels for calculating an approximate straight line together with the center pixel in the main scan direction that is the pixel surrounded by a long dashed dotted line in the third diagram of FIG. 16.

Then, the CPU 31 detects an approximate straight line based on arrangement of the selected pixels by a least-square method and detects the calculated approximate straight line as the document upper side. When the approximate straight line extends downward from left to right as illustrated in FIG. 15B, the CPU 31 detects, as a left end of the document upper side, a point (an intersection PC in FIG. 15B) where a straight line extending from the end pixel PL of the document lift side in a direction orthogonal to the approximate straight line crosses the approximate straight line. The CPU 31 detects a side connecting the intersection PC and the pixel PL as the document left side. Further, the CPU 31 detects a side extending parallel to the document left side from the pixel PR as the document right side.

In this manner, the CPU 31 detects the upper, left, and right sides of the document as the document edge in S190. When the calculated approximate straight line extends downward from right to left, the CPU 31 executes the above processing in a left-right reversal manner to detect the upper, left, and right sides of the document as the document edge.

Information concerning the detected upper, left, and right sides of the document Q is used for detecting the position and inclination of the document Q and setting the operation parameters in the document correction circuit 100 in S200 as described above. Additionally, in the above detection method of the upper, left, and right sides of the document Q, some of the pixels belonging to the edge pixel group of the center area in the main scan direction are used for calculating the approximate straight line. As a result, the calculation reduces a possibility that the edge pixel erroneously extracted due to noise is used in the calculation of the approximate straight line; however, all the pixels belonging to the edge pixel group in the main scan direction center area may be used to calculate the approximate straight line.

The multifunction machine 1 according to the present embodiment has thus been described. According to the multifunction machine 1, the line sensor 23 is configured to read the white reference member 27 before the reading of the document Q to acquire the white reference data and black reference data representing the read image of the white reference member 27. Thereafter, the line sensor 23 is made to read the document Q to acquire the read image data of the document Q.

The black correction circuit 73 applies black correction to the read image data of the document to generate the read image data after the black correction as document image data. The shading calibration circuit 75 applies shading calibration to the density value of each pixel represented by the read image data after the black correction on the basis of the read image data after the black correction and the white image data obtained by correcting the white reference data using the black reference data. At this time, the shading calibration circuit 75 performs the shading calibration such that not the density value of the white image data, but a density value larger than the density value of the white image data is set to the maximum gradation value so as to prevent information of the white edge from being lost. Thus, the shading calibration circuit 75 generates, as the read image data after shading calibration, calibrated image data in which the density value of each pixel is represented by the gradation value of a predetermined number of gradation levels, and the white edge is brighter than the surrounding pixels.

Then, the shading calibration circuit 75 inputs the calibrated image data as base data of multi-gradation image data for output to the gamma correction circuit 79 of the scan circuit 70 through the main scan processing circuit 77. At the same time, the shading calibration circuit 75 inputs the calibrated image data as base data of edge detecting image data to the gamma correction circuit 83 through the main scan processing circuit 81 of the scan bypass circuit 80.

In order to generate high quality image data as the multi-gradation image data for output, the gamma correction circuit 79 of the scan circuit 70 applies gamma correction to the calibrated image data. The gamma correction circuit 79 converts the gradation values in the range from the minimum gradation value to a target gradation value into the gradation values in the range from the minimum gradation value to the maximum gradation value. The gamma correction circuit 79 corrects the gradation values that are larger than the target gradation value into the maximum gradation value, to thereby generate the multi-gradation image data of a predetermined number of gradation levels. On the other hand, the gamma correction circuit 83 of the scan bypass circuit 80 applies gamma correction to the calibrated image data so as to emphasize the white edge to generate the edge detecting image data.

The document edge detection circuit 90 applies moving average processing, differential processing, and binarization processing to the edge detecting image data. The document edge detection circuit 90 extracts the edge pixel group which is a group of pixels estimated to be the document edge and provides the edge position data which is position information of the edge pixel group to the CPU 31. Based on the edge position data, the CPU 31 detects the upper, left, and right sides of the document Q as the document edge and further detects the inclination and position of the document Q. In addition, the CPU 31 set, in the document correction circuit 100, the operation parameters for inclination correction and extraction of the document Q.

Thus, according to the present embodiment, as illustrated in FIG. 5, the edge detecting image data can be generated in such a way that information of the white edge is not lost even when a white edge, which has a density value exceeding the density value of the white reference data, occurs. Accordingly, the document edge can be detected with high accuracy from the edge detecting image data. On the other hand, the gamma correction is performed on the document Q. The gamma correction prevents the image quality of the document Q from being deteriorated in the multi-gradation image data, which is for output. Thus, according to the multifunction machine 1 of the present embodiment, even in a situation where the white edge may occur, the document edge can be detected with high accuracy while high quality image data of the document Q is maintained, and inclination correction of the document Q can be carried out appropriately.

While the description has been made in detail with reference to specific embodiment thereof, it would be apparent to those skilled in the art that various changes and modifications may be made therein without departing from the spirit and scope of the above described embodiment.

For example, the technical concept of the present disclosure is applicable to a scanner device not provided with a copy function or a printer function. Further, the technical concept of the present disclosure is applicable to a scanner device having a line sensor provided on both sides of the document Q for reading the document Q.

A function provided by a single constituent element according to the above-described embodiment may be dispersed as a plurality of constituent elements, or a function provided by a plurality of constituent elements may be integrated into a single constituent element. A part of the confirmation of the above embodiment may be omitted. Any embodiment included in the technical concept specified only by the wordings of the claims is an embodiment of the present disclosure.

The line sensor 23 of the multifunction machine 1 corresponds to an example of a reading device, and the AD sampling circuit 71 corresponds to an example of an acquisition unit. The shading calibration circuit 75 of the scan circuit 70 corresponds to an example of a first correction unit, and the gamma correction circuit 79 corresponds to an example of a second correction unit. The processing realized by the gamma correction circuit 83 of the scan bypass circuit 80 and the document edge detection circuit 90 and processing that the CPU 31 executes in S190 correspond to an example of processing realized by an edge detection unit, and the document correction circuit 100 corresponds to an example of an image processing unit.

What is claimed is:

1. An image reading system comprising:
    a reading device configured to read a white reference member to acquire white image data and configured to read an original document to acquire document image data, the original document having an edge, the document image data having pixels corresponding to the edge of the original document;
    a first calibration unit configured to calibrate shading of the document image data to generate first image data as image data by performing:
        comparing a density value of each pixel in the document image data to a corresponding density value of a corresponding pixel in the white image data; and
        converting the density value of each pixel in the document image data to a gradation value of the each pixel in the first image data, the gradation value of each pixel in the first image data being proportional to the density value of the each pixel in the document image data and falling within a predetermined range having a minimum gradation value, a maximum gradation value, and a target value less than the maximum gradation value such that:
            the density value of a pixel in the document image data less than the corresponding density value in the white image data is converted to a gradation value of the pixel in the first image data less than the target value in the conversion;
            the density value of a pixel in the document image data equal to the corresponding density value in the white image data is converted to a gradation value of the pixel in the first image data equal to the target value in the conversion; and
            the density value of a pixel in the document image data greater than the corresponding density value in the white image data is converted to a gradation value of the pixel in the first image data greater than the target value in the conversion,
            the target value being defined relative to the maximum gradation value as such a value that prevents density values of pixels in the document image data corresponding to the edge of the original document from being saturated to the maximum gradation value in the conversion; and a detection unit configured to detect pixels in the first image data corresponding to the edge of the original document.

2. The image reading system according to claim 1, wherein the first calibration unit in the conversion is configured to convert the density value in the document image data to the gradation value in accordance with the equation and the inequality as follows:

$$Cg = C \times C2/C1,$$

and $$Cgmax \geq Cmax \times C2/C1,$$

where
Cg is the gradation value,
C is the density value,
C1 is the corresponding density value in the white image data,
C2 is the target value,
Cmax is a maximum density value, and
Cgmax is the maximum gradation value.

3. The image reading system according to claim 1, further comprising a second calibration unit configured to execute gamma correction on the first image data to generate second image data by performing converting:
the target value in the first image data to a first value greater than the target value,
the gradation value in the first image data greater than or equal to the minimum gradation value and less than the target value to a gradation value greater than or equal to the minimum gradation value and less than the first value, and
the gradation value in the first image data greater than the target value to a gradation value greater than or equal to the first value and less than or equal to the maximum gradation value.

4. The image reading system according to claim 3, wherein the first value is the maximum gradation value; and
wherein the second calibration unit is configured to convert:
the gradation value in the first image data greater than the target value to the maximum gradation value, and
the gradation value in the first image data less than or equal to the target value to the gradation value falling in a range from the minimum gradation value to the maximum gradation value.

5. The image reading system according to claim 1, wherein the detection unit is further configured to execute gamma correction on the first image data to generate a third image data by performing converting:
the target value in the first image data to a second value less than the target value;
the gradation value in the first image data greater than or equal to the minimum gradation value and less than the target value to a gradation value greater than or equal to the minimum value and less than the second value; and
the gradation value in the first image data greater than the target value and less than or equal to the maximum gradation value to a gradation value greater than the second value and less than or equal to the maximum gradation value; and
wherein the detection unit in the detection is configured to detect the pixels in the third image data corresponding to the edge of the original document.

6. The image reading system according to claim 5, wherein the detection unit is configured to further perform:
calculating a moving average of the gradation values in the third image data to generate an average gradation value in the third image data; and
differentiating the average gradation value to generate a differentiated gradation value in the third image data; and
wherein the detection unit in the detection is configured to detect the pixels corresponding to the edge of the original document based on the differentiated gradation value in the third image data.

7. The image reading system according to claim 5, wherein the detection unit is configured to further perform:
calculating a moving average of the gradation values in the first image data to generate an average gradation value in the first image data; and
differentiating the average gradation value to generate a differentiated gradation value in the first image data; and
wherein the detection unit in the detection is configured to detect the pixels corresponding to the edge of the original document based on the differentiated gradation value in the first image data.

8. The image reading system according to claim 6, wherein the detection unit is configured to perform in the detection:
binarizing the third image data to generate binary data by comparing the differentiated gradation value in the third image data to a threshold value;
detecting the pixels corresponding to the edge of the original document in the binary data; and
calculating an approximate straight line of the pixels corresponding to the edge of the original document.

9. The image reading system according to claim 7, wherein the detection unit is configured to perform in the detection:
binarizing the third image data to generate binary data by comparing the differentiated gradation value in the first image data to a threshold value;
detecting the pixels corresponding to the edge of the original document in the binary data; and
calculating an approximate straight line of the pixels corresponding to the edge of the original document.

10. The image reading system according to claim 3, further comprising an image processing unit configured to perform, based on the edge of the original document detected by the detection unit, at least one of:
calibrating an inclination of the second image data; and
extracting an image data corresponding to the original document from the second image data.

* * * * *